United States Patent
Lin

(10) Patent No.: US 9,998,713 B2
(45) Date of Patent: Jun. 12, 2018

(54) DEVICE AND SYSTEM FOR SECURITY MONITORING

(71) Applicant: Che Wei Lin, Hsinchu (TW)

(72) Inventor: Che Wei Lin, Hsinchu (TW)

( * ) Notice: Subject to any disclaimer, the term of this patent is extended or adjusted under 35 U.S.C. 154(b) by 270 days.

(21) Appl. No.: 14/805,861

(22) Filed: Jul. 22, 2015

(65) Prior Publication Data
US 2017/0024987 A1  Jan. 26, 2017

(51) Int. Cl.
*G08B 13/196* (2006.01)
*H04N 7/18* (2006.01)

(52) U.S. Cl.
CPC .......... *H04N 7/186* (2013.01); *H04N 7/183* (2013.01); *G08B 13/19619* (2013.01)

(58) Field of Classification Search
CPC ... H04N 7/186; H04N 7/183; G08B 13/19619
See application file for complete search history.

(56) References Cited

U.S. PATENT DOCUMENTS

| | | | | |
|---|---|---|---|---|
| 8,520,072 B1 * | 8/2013 | Slavin | ............. | G08B 13/19684 348/143 |
| 9,207,659 B1 * | 12/2015 | Sami | ............. | G05B 15/02 |
| 2005/0140783 A1 * | 6/2005 | Akamatsu | ............. | H04N 7/20 348/143 |
| 2006/0274166 A1 * | 12/2006 | Lee | ............. | G11B 27/10 348/231.99 |
| 2010/0102929 A1 * | 4/2010 | Haumann | ............. | G01S 5/02 340/5.81 |
| 2011/0141277 A1 * | 6/2011 | Midkiff | ............. | H04N 7/181 348/143 |
| 2011/0316682 A1 * | 12/2011 | Pan | ............. | B60R 25/10 340/426.24 |
| 2016/0105406 A1 * | 4/2016 | Smith | ............. | H04L 63/061 713/171 |
| 2016/0132120 A1 * | 5/2016 | Fan | ............. | G06F 3/017 348/150 |
| 2016/0374494 A1 * | 12/2016 | Geng | ............. | A47G 29/141 232/17 |
| 2017/0132896 A1 * | 5/2017 | Pratt | ............. | G08B 21/02 |

* cited by examiner

*Primary Examiner* — Huy T Nguyen
(74) *Attorney, Agent, or Firm* — WPAT, P.C., Intellectual Property Attorneys; Anthony King

(57) ABSTRACT

The present disclosure provides a security device that comprises a first input/output (I/O) port for remote communication over a first network, a second I/O port for local communication over a second network, a camera, and a processing unit configured to keep the camera at a disabled state until an alert signal indicating an event is received from a sensor over the second network, and report the event to a server over the first network.

18 Claims, 8 Drawing Sheets

DEVICE AND SYSTEM FOR SECURITY MONITORING

TECHNICAL FIELD

The present invention relates to security monitoring and, more particularly, to a device and a system that provide communication and surveillance for security monitoring at multiple sites in a secured area.

BACKGROUND

Electronic security systems have become a popular way of securing and monitoring property. For example, more and more electronic security systems are installed at locations of interest such as homes, offices, buildings and structures for the safety and protection of personnel, property and surroundings. While security systems have been useful for detecting certain types of intrusions, vandalism or attempted thefts, there remains an increasing need to improve their convenience of use.

In some existing security systems, electronic surveillance equipment is provided to monitor a specific location. To monitor several locations in an area of interest, these systems involve one guard who monitors a video feed or alarm panel for intrusion or other related alerts. The current development of security systems, however, attempts to do away with human-oriented services and replace the human security guard with advanced technology solutions to security problems. Moreover, there is an increasing demand for power management in a security system while providing 24-hour surveillance.

SUMMARY

The present invention relates to a security system that provides protection for more than one locations in an area of interest without any security guard. Moreover, the present invention provides a security system that allows some of its components to operate in a standby mode in order for lower power consumption.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Embodiments, or examples, of the disclosure illustrated in the drawings are now described using specific languages. It will nevertheless be understood that no limitation of the scope of the disclosure is thereby intended. Any alterations and modifications in the described embodiments, and any further applications of principles described in this document are contemplated as would normally occur to one of ordinary skill in the art to which the disclosure relates. Reference numbers may be repeated throughout the embodiments, but this does not necessarily require that feature(s) of one embodiment apply to another embodiment, even if they share the same reference number.

It will be understood that when an element is referred to as being "connected to" or "coupled to" another element, it may be directly connected to or coupled to the other element, or intervening elements may be present.

The term "enable," "enabled" or "enabling" is used in the present disclosure to describe an operation of powering and/or activating a device or component within a device. In some embodiments, an enabling operation involves electrically connecting power supply to a device or component and awaiting the supply power level at function nodes to ramp up to an operation state. In other embodiments, an enabling operation further includes an additional period of time for a device or component to complete routine initializations such as reset in a buffer or register, or capacitor reset.

The term "disable," "disabled" or "disabling" is used in the present disclosure to describe an operation of disconnecting a device or component within a device from power supply. In some embodiments, however, whereas a disabling operation cuts off all electrical disconnection between device/component and power supply, some device or component may still maintain power at internal nodes for specific purposes. Thus an operation of disabling does not necessarily guarantee a complete halt of power consumption.

Figure 1:
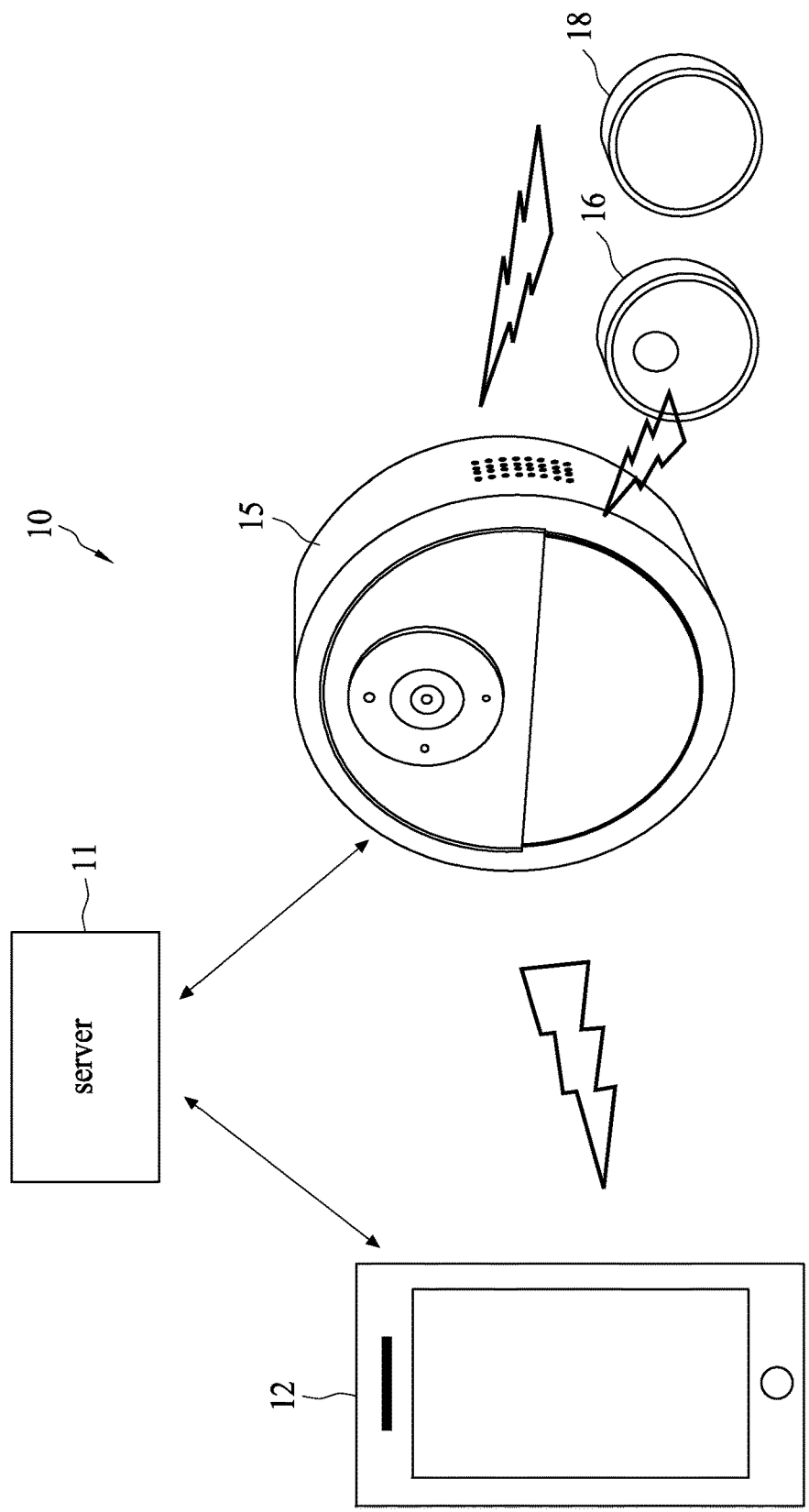

The objectives and advantages of the present invention are illustrated with the following description and upon reference to the accompanying drawings, in which:

FIG. 1 is a schematic diagram of a security system in accordance with some embodiments of the present invention.

Figure 2:
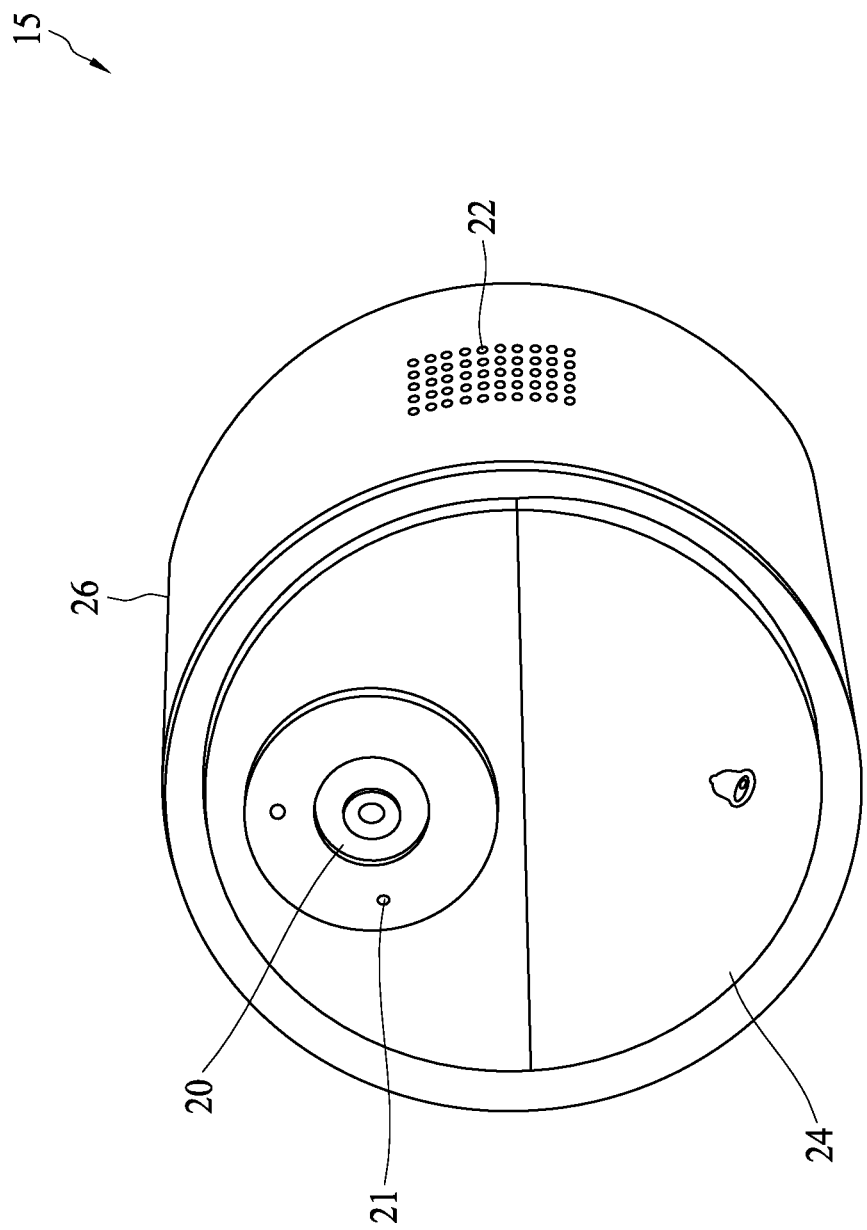

FIG. 2 is a perspective view of a security device, in accordance with some embodiments of the present invention.

Figure 3:
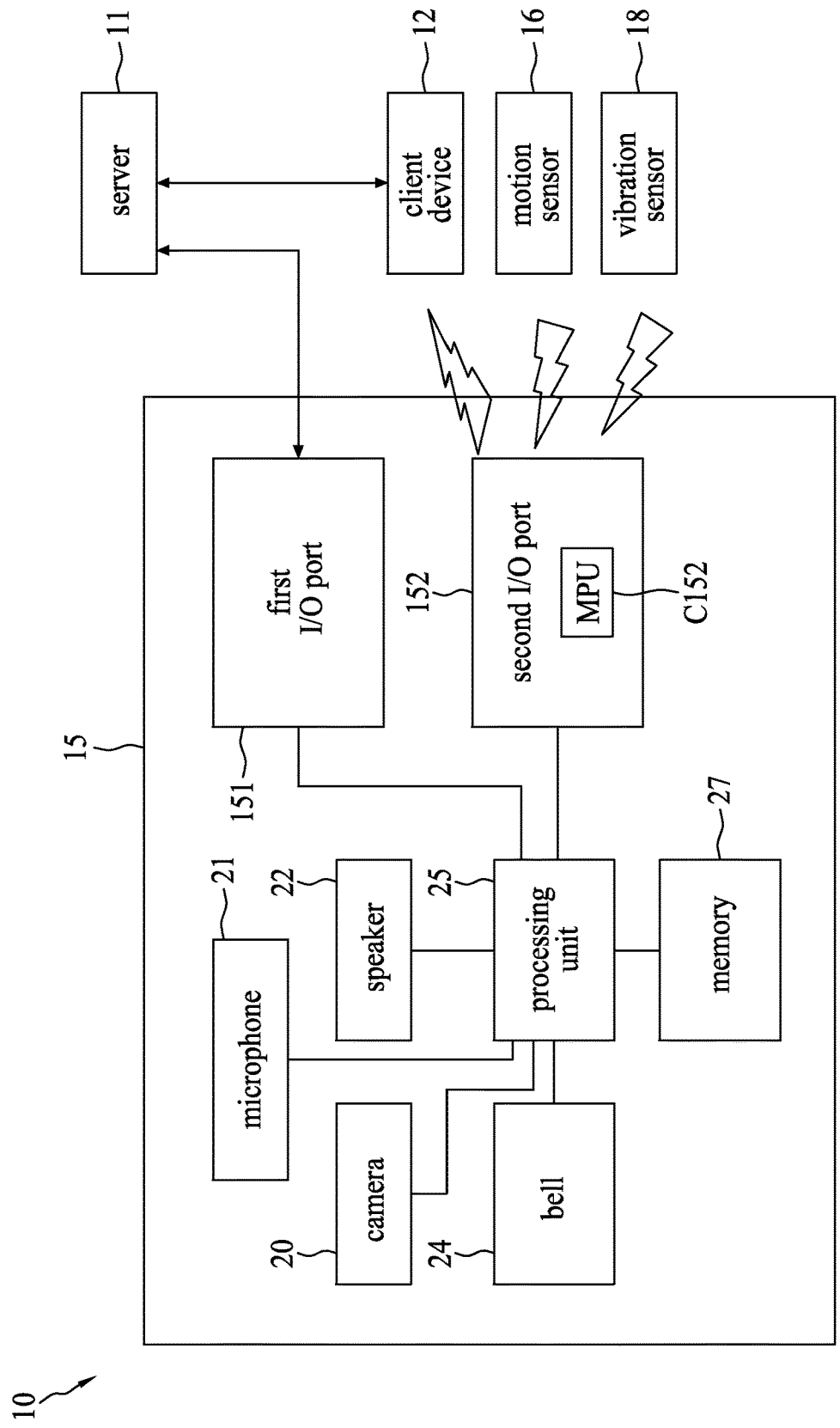

FIG. 3 is a block diagram of the security system in accordance with some embodiments of the present invention.

Figure 4:
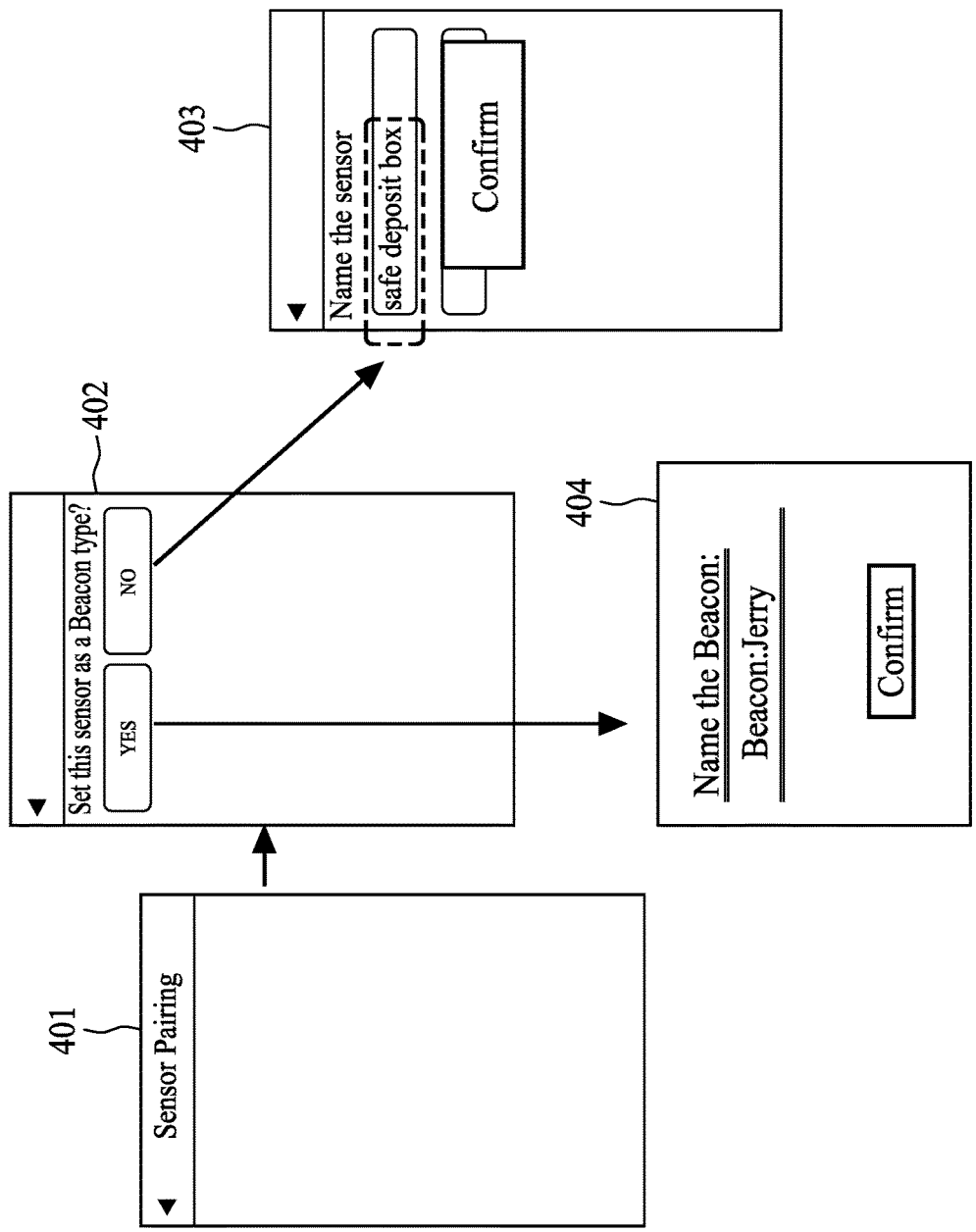

FIG. 4 is a schematic diagram showing a pairing procedure in accordance with some embodiments of the present invention.

Figure 5:
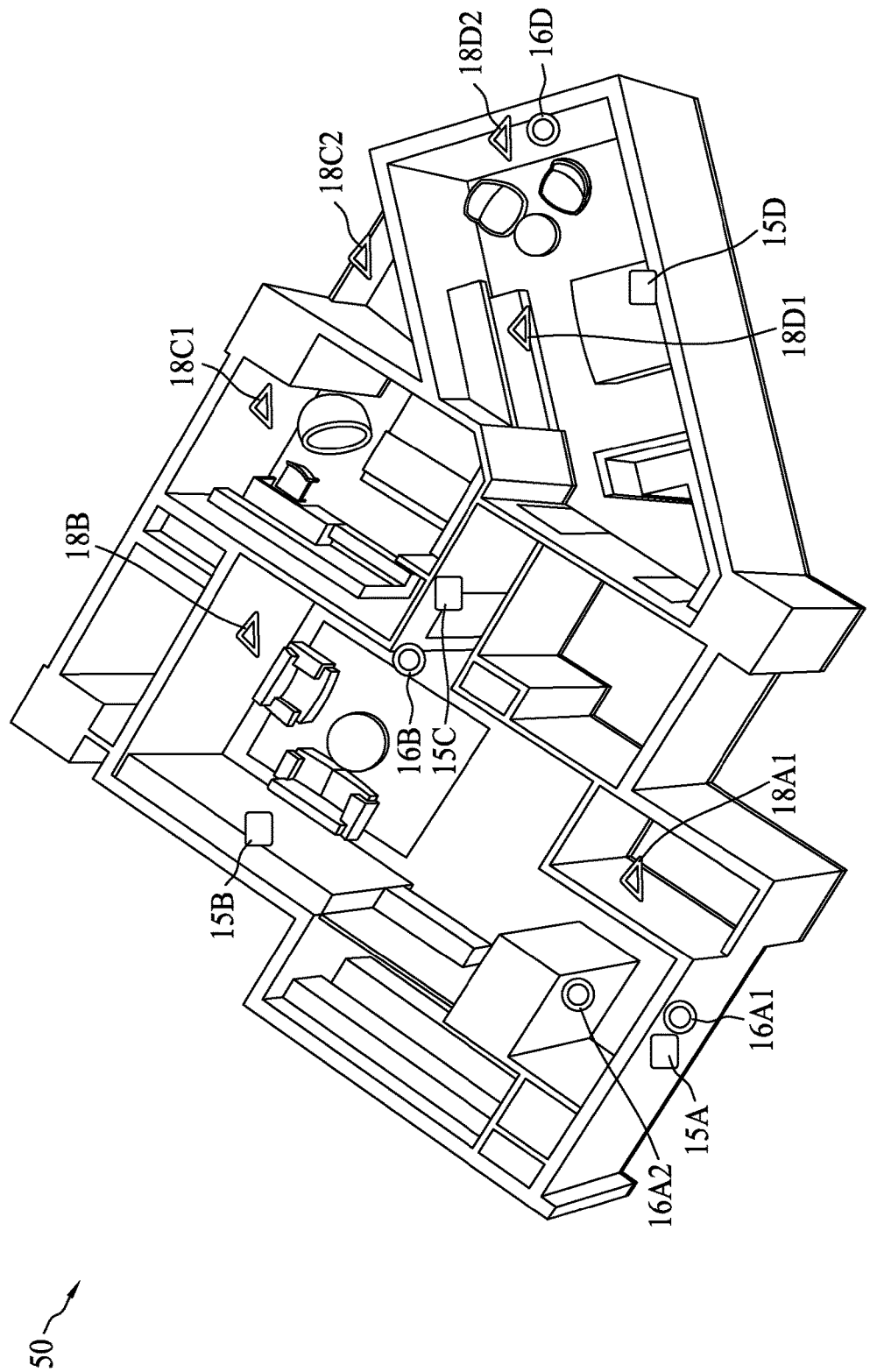

FIG. 5 is a diagram showing an exemplary deployment of paired devices for a building.

Figure 6:
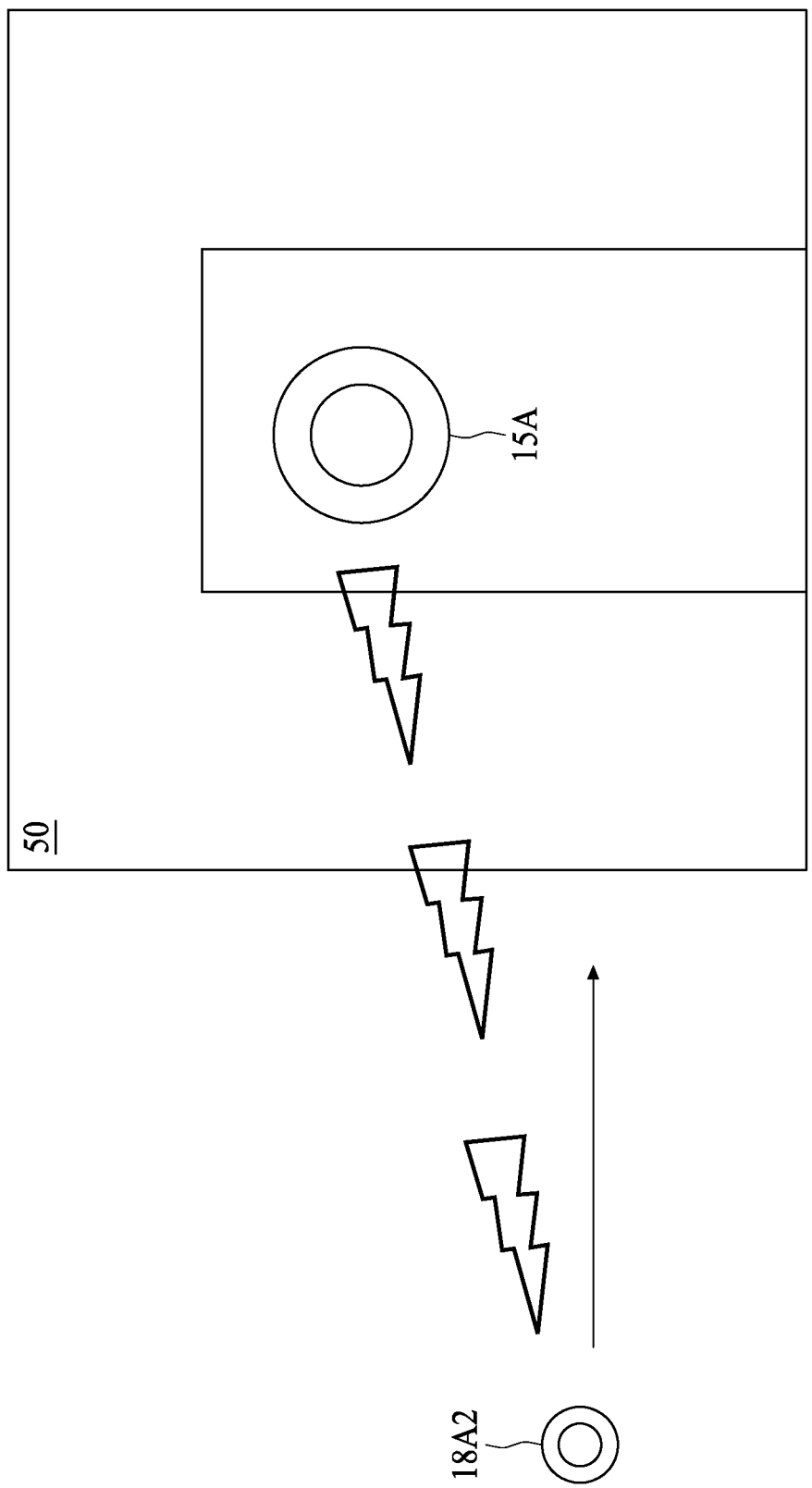

FIG. 6 is a diagram showing the security device operating in a check-in/beacon mode in accordance with some embodiments of the present invention.

Figure 7:
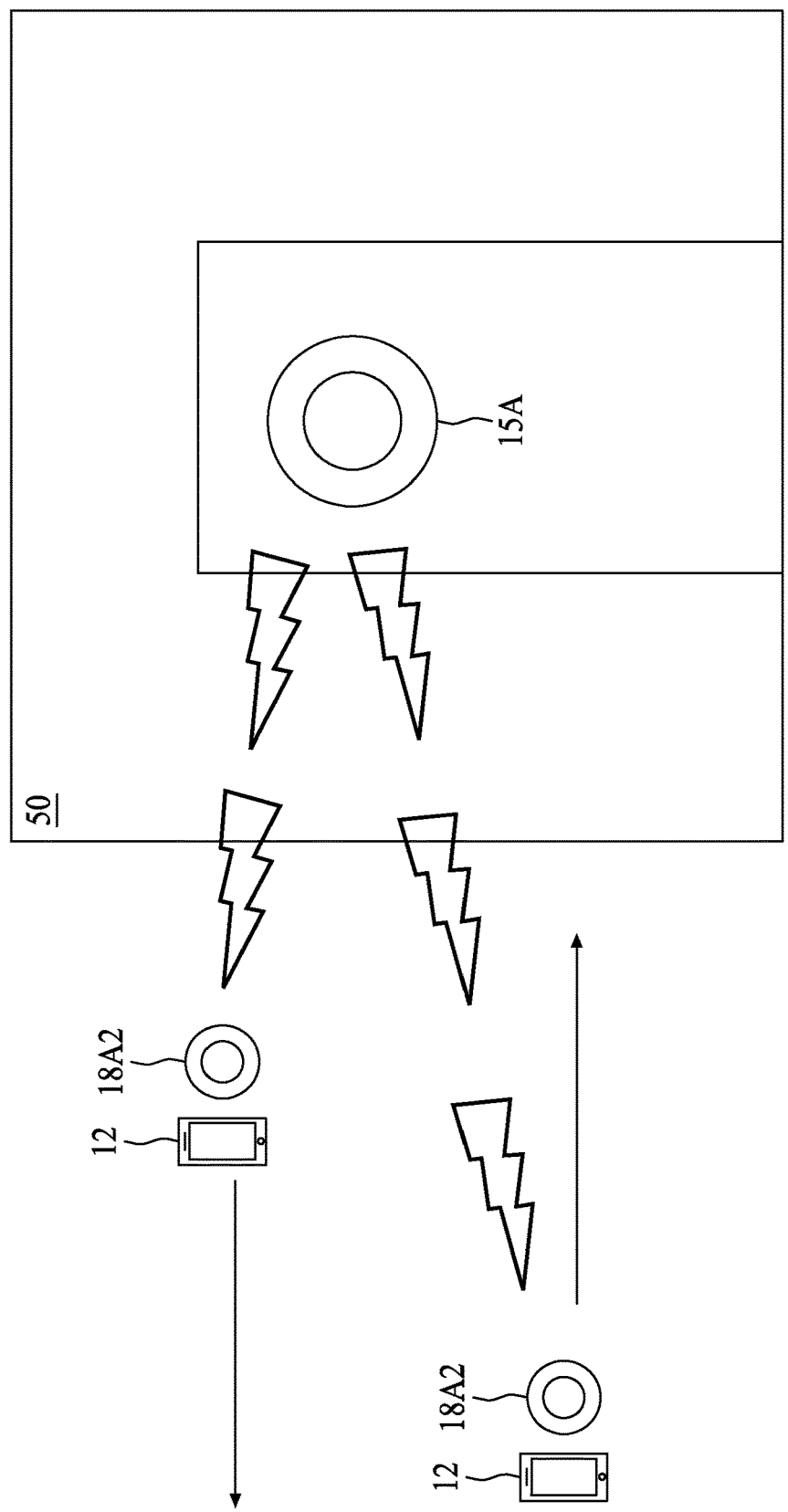

FIG. 7 is a diagram showing a method of automatically switching a security device, in accordance with some embodiments of the present invention.

Figure 8:
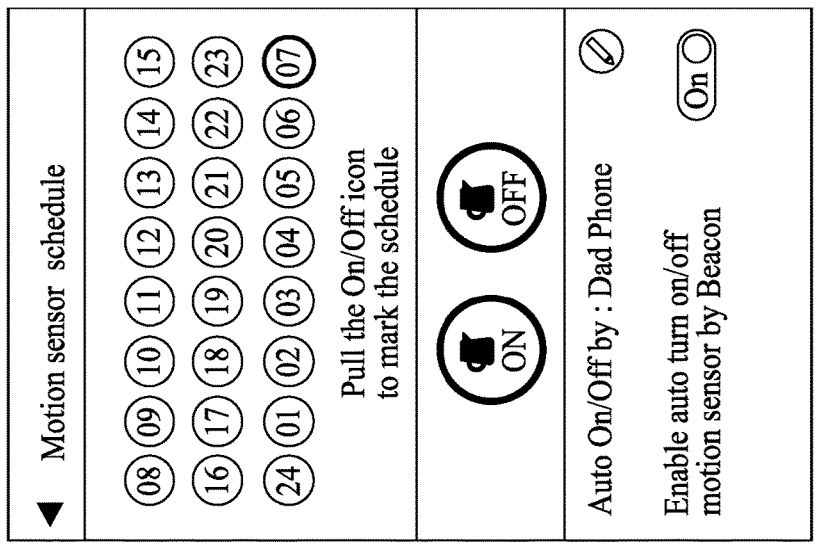

FIG. 8 is a diagram showing a method of scheduling a motion sensor, in accordance with some embodiments of the present invention.

DETAILED DESCRIPTION

The embodiments of the present invention are shown in the following description with the drawings, wherein similar or same components are indicated by similar reference numbers.

FIG. 1 is a schematic diagram of a security system 10 in accordance with some embodiments of the present invention. Referring to FIG. 1, the security system 10 includes a server 11, a client device 12, a security device 15, a motion sensor 16 and a vibration sensor 18.

The server 11 is configured to communicate with the client device 12 and the security device 15 via a first network (shown in a double-headed arrow). Examples of the first network may include WiFi, $3^{rd}$-Generation (3G), $4^{th}$-Generation (4G) or more advanced techniques.

The client device 12 is configured to communicate with the server 11 via the first network, and communicate with the security device 15, motion sensor 16 and vibration sensor 18 via a second network (shown in a thunderbolt). Examples of the second network may include Bluetooth®. The client device 12 may include a computing device such as a personal computer (PC), laptop, notebook computer, personal digital assistant (PDA) or smartphone.

The security device 15 is installed or mounted at a location of interest in an area to be protected. For example, the security device 15 is installed at a front door of a building, or on a wall inside the building. Moreover, the security device 15 is able to maximize its protection service in an area of interest with the help of the motion sensor 16 and the vibration sensor 18. Therefore, the motion sensor 16 and vibration sensor 18 are deployed with respect to the security device 15 within a communication range covered by the second network.

For convenience, only one security device, one motion sensor and one vibration sensor are shown. In implementation, the security device 15 may pair with more than one, for example, five or six motion sensors 16. Likewise, the security device 15 may pair with more than one, for example, five or six vibration sensors 18. Furthermore, the security device 15 may pair with at least one motion sensor 16 and at least one vibration sensor 18, for example, five or six in total. Moreover, in the security system 10, more than one security devices 15 may be used to facilitate multi-location surveillance. In addition, more than one client devices 12 may be serviced in the security system 10. For example, a single client device 12 may pair with more than one security devices 15, while a single security device 15 may be paired with more than one client devices 12. As a result, different number of client devices 12, security devices 15 and motion sensors 16 and vibration sensors 18 associated with the security devices 15 also fall within the contemplated scope of the present invention. Deployment and pairing of the security device 15, motion sensor 16 and vibration sensor 18 will be described in detail below.

FIG. 2 is a perspective view of the security device 15, in accordance with some embodiments of the present invention. Referring to FIG. 2, the security device 15 includes a camera 20, a microphone 21, a speaker 22 and a bell 24, which are assembled in a housing 26.

The camera 20 is configured to capture an image at a certain moment or during a period of time in its field of view (FOV). Examples of the camera 20 include a charge coupled device (CCD) camera and a complementary metal oxide semiconductor (CMOS) camera. The camera 20 allows the host or one in a house or building to have a one-way video call with a visitor. Specifically, when a visitor presses the bell 24, or a motion sensor 16 or a vibration sensor 18 is triggered due to the approaching of a visitor, the host may respond to the visitor's call through the speaker 22 while watching a video image of the visitor taken by the camera 20.

The microphone 21 is configured to receive sound and convert the same into an electrical signal. For example, when a visitor speaks to the microphone 21, the microphone 21 receives the voice of the visitor. The speaker 22 is configured to convert an electrical signal into sound. By means of the speaker 22 and the microphone 21, the host can have a two-way audio call with a visitor. The bell 24 is configured to ring when activated, for example, in response to pressing thereon.

The housing 26 physically protects the camera 20, microphone 21, speaker 22 and bell 24, and facilitates the installment of the security device 15 at a specific location. For example, the security device 15 may be attached to a front door by adhesive tapes on an outer surface of the housing 26.

Moreover, the security device 15 is configured to support applications of beacon technology, which enables the client device 12 to perform actions when in close proximity to the security device 15. For example, user of the client device 12 may watch an image from the camera 20, listen to the talk of a visitor from the microphone 21 and speak to the visitor through the speaker 22 when the client device 12 is in the proximity of the security device 15. In an embodiment, the range of beacon transmission is approximately ten 10 meters. Furthermore, also referring to FIG. 1, the security device 15 and the client device 12 may communicate via the second network when the client device 12 is in the beacon transmission range of the security device 15.

FIG. 3 is a block diagram of the security system 10 in accordance with some embodiments of the present invention. In addition to those illustrated and described with reference to FIG. 1, components of the security device 15 are schematically shown in FIG. 3. Referring to FIG. 3, the security device 15 further includes a processing unit 25, a memory 27, a first I/O (input/output) port 151 and a second I/O port 152. Moreover, the second I/O port 152 includes a Bluetooth device (not shown) and a micro processing unit C152. In some embodiments, the micro processing units C152 is incorporated in the processing unit 25.

The processing unit 25 is coupled to the other components of the security device 15 so that electrical signals and instructions can be transmitted therebetween. Regarding power management, the security device 15 is configured to operate in a normal mode or a standby mode. In an embodiment, at least one of the camera 20, microphone 21, speaker 22 or first I/O port 151 is turned off by the micro processing unit C152 in the standby mode to facilitate power saving. In another embodiment, the camera 20, microphone 21, speaker 22 and first I/O port 151 are all turned off by the micro processing unit C152 in the standby mode to facilitate a more efficient power management. No matter whether the security device 15 operates in the normal mode or standby mode, the bell 24 and the micro processing unit C152 are kept active. As a result, to save power consumption, the security device 15 may be kept operating in the standby mode and not switch to the normal mode until one of the following events occurs:

(1) the motion sensor 16 is triggered and reports a motion event to the micro processing unit C152, which in turn sends a power signal to the processing unit 25, causing the security device 15 to enter the normal mode;

(2) the vibration sensor 18 is triggered and reports a vibration event to the micro processing unit C152, which in turn sends a power signal to the processing unit 25, causing the security device 15 to enter the normal mode;

(3) the bell 24 is pressed; and (4) the client device 12 calls for service of the security device 15 over the second network via the micro processing unit C152 in the second I/O port 152. For example, user of the client device 12 would like to watch an image, either still or video, of the camera 20, and sends a request to the micro processing unit C152 over the second network. In response to the request, the micro processing unit C152 wakes up the camera 20 and sends an image taken by the camera 20 to the client device 12 via the first I/O port 151 over the first network.

In some embodiments in accordance with the present disclosure, the processing unit 25 includes a central processing unit (CPU) or part of a computing module. The processing unit 25 is configured to execute one or more programs stored in the memory 27. Accordingly, the processing unit 25 is configured to enable the security device 15 to perform specific operations disclosed herein. It is to be noted that the operations and techniques described herein may be implemented, at least in part, in hardware, software, firmware, or any combination thereof. For example, various aspects of the described embodiments may be implemented within one or more processing units, including one or more microprocessing units, digital signal processing units (DSPs), application specific integrated circuit (ASIC) devices, field programmable gate array (FPGA) devices, system-on-chip (SOC) devices or any other equivalent integrated or discrete logic circuitry, as well as any combinations of such components. The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

The memory 27 is configured to store data. For example, the memory 27 stores an image captured by the camera 20, a voice message left by a visitor or both. In addition, the memory 27 stores different audio effects such as ring tones, pieces of music, voices or a combination thereof. In some embodiments, the audio effects are recorded by a user through the microphone 21 in advance. Moreover, one of the audio effects corresponds to a specific user of a client device 12. As a result, a user can be easily identified when an audio effect corresponding to the user is played.

In some embodiments, the memory 27 stores an identity (ID) of a security device and the GPS (global positioning system) coordinates of a first client device paired with the security device. The ID of a security device may be given by a manufacturer of the security device. During an initial set-up of the security device, the current GPS coordinates of the first client device is sent to the security device and stored in the memory 27. Afterwards, when a new set-up is required, the current GPS coordinates of a client device (maybe or may not be the first client device) and the ID of the security device are sent to the processing unit 25 for comparison against the stored GPS coordinates and the sored ID. If the GPS coordinates are different from the stored GPS coordinates by an offset, for example, greater than fifty meters, the server 11 would send a message to the first client device, informing the user of the first client device that a second client device not paired with the security device is using the security device. Thus, when the security device is stolen and used by a different user, the user of the first client device is actually informed of a theft. The user of the first client device may report the theft so that the stolen security device can be locked or disabled. Moreover, the server 11 can track the GPS location of the stolen security device based on its ID. As such, potential theft of the security device can be avoided.

In some embodiments in accordance with the present disclosure, the memory 27 includes any computer readable medium, including, but not limited to, a random access memory (RAM), read only memory (ROM), programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In some embodiments, the memory 27 is secure digital memory card. In certain embodiments, the memory 27 is incorporated into the processing unit 25.

The first I/O port 151 includes a network interface component, such as an Ethernet card, an optical transceiver, a radio frequency transceiver, or any other type of device that can send and receive data from the Internet. Examples of network interfaces of the first I/O port 151 include 3G, 4G and WiFi. The security device 15 wirelessly communicates with the server 11 via the first I/O port 151 over the first network. In addition, the server 11 and the client device 12 communicate with each other over the first network.

The second I/O port 152 also includes a network interface component. An example of the network interfaces of the second I/O port 152 includes Bluetooth. The security device 15 wirelessly communicates with the client device 12, the motion sensor 16 and the vibration sensor 18 via the second I/O port 152 over the second network.

The motion sensor 16, when paired with the security device 15, works in conjunction with the security device 15. Moreover, the motion sensor 16 may be installed or mounted at a fixed location. In that case, the motion sensor 16 functions to detect a motion event of an object as the object enters into its field of view (FOV), for example, an angle of view of approximately 150 degrees. Specifically, when an object enters the FOV, the motion sensor 16 is triggered and reports such a motion event over the second network to the security device 15, which in turn reports the same via the server 11 to the client device 12 over the first network, or directly reports the same to the client device 12 over the second network if the client device 12 is in the beacon coverage. In response to the motion event, the security device 15 paired with the motion sensor 16 enables the camera 20 to capture an image of the location under protection by the motion sensor 16, and sends the image to the client device 12 for an alert.

In an embodiment, the motion sensor 16 includes a passive infrared (PIR) sensor and a communicating device. The PIR sensor is able to detect changes in the amount of infrared light impinging thereupon as an object draws near the PIR sensor. The communicating device, for example, a Bluetooth device, notifies the security device 15 of a motion event in response to a detection triggered.

The vibration sensor 18, when paired with the security device 15, also works in conjunction with the security device 15. The vibration sensor 18 is triggered when there is a change in its orientation and reports a vibration event to the security device 15 via the second network. In implementation, the vibration sensor 18 is installed on or attached to an object of interest. For example, the vibration sensor 18 may be installed on a safe deposit box, locker or French window. When the object is moved or dislocated, the orientation of the object and hence the orientation of the vibration sensor 18 changes. In response to the vibration event, the security device 15 paired with the vibration sensor 18 enables the camera 20 to capture an image of the location under protection by the vibration sensor 18, and sends the image to the client device 12 for an alert.

The vibration sensor 18 includes an acceleration (g-force) sensor (or G sensor), a magnet meter sensor and a communicating device. The G sensor detects a change in its orientation due to a force applied thereto. The magnet meter sensor detects a magnetic field direction. With the magnet meter sensor, the security device 15, paired with a client device (also including a magnetic meter sensor) or a vibration sensor or both, can be automatically switched between normal mode operation and standby mode operation, as will be discussed in detail below. The communicating device, for example, a Bluetooth device, reports a vibration event to the security device 15 when the vibration sensor 18 is triggered.

The vibration sensor 18 is configured to support the beacon technology. In that case, instead of being installed or mounted at a specific spot, the vibration sensor 18 may be carried by a mobile object such as a vehicle or a human being. When the mobile object with the vibration sensor 18 enters into the beacon coverage of the security device 15, the security device 15 reports a vibration event to the client device 12, either indirectly via the server 11 over the first network or directly over the second network.

In some embodiments, the security device 15 is automatically switched to normal mode operation when a user of the client device 12 or a user carrying a vibration sensor 18 moves out of the area under protection of the security system 10. For example, the security device 15 may be installed at the front door of a house. When the user carrying the client device 12 or vibration sensor 18 walks out of the house, the security device 15 enters the normal mode in response to the walk-out event.

On the other hand, the security device 15 is automatically switched to standby mode operation when a user of the client device 12 or a user carrying a vibration sensor 18 moves into the area under protection of the security system 10. For example, when the user carrying the client device 12 or vibration sensor 18 walks in the house, the security device 15 enters the standby mode in response to the walk-in event.

To achieve the function of automatic switching to normal mode, the client device 12 and the vibration sensor 18 are set up in a procedure below. For convenience, only an exemplary procedure for setting the client device 12 is discussed.

(1) the user holding the client device 12 walks out of the house from the front door where the security device 15 is installed;

(2) the magnetic meter sensor of the client device 12 determines the direction of the client device 12, that is, from the front door to the outside of the house;

(3) the processing unit 25 of the security device 15 measures the value of received signal strength indication (RSSI), which increases as the client device 12 moves closer to the security device 15, while decreases as the client device 12 moves away from the security device 15; and (4) based on a combined information on the outward direction and decreasing RSSI value of the client device 12, a walk-out event can be determined.

Consequently, after the client device 12 is set up, such walk-out events can be recognized by the processing unit 25. In response to a walk-out event, the security device 15 enters normal mode to operate at an alert state in order for security protection.

Similarly, to achieve the function of automatic switching to standby mode, the client device 12 is set up as follows.

(1) the user holding the client device 12 walks from outside of the house towards the front door where the security device 15 is installed;

(2) the magnetic meter sensor of the client device 12 determines the direction of the client device 12, that is, from outside of the house to the front door;

(3) the processing unit 25 of the security device 15 measures the RSSI value; and (4) based on a combined information on the inward direction and increasing RSSI value of the client device 12, a walk-in event can be determined.

Consequently, after the client device 12 is set up, such walk-in events can be recognized by the processing unit 25.

In response to a walk-in event, the security device 15 enters standby mode to operate at a power saving state in order for efficient power management.

FIG. 4 is a schematic diagram showing a pairing procedure in accordance with some embodiments of the present invention. In the security system 11, pairing is required between the security device 15 and the client device 12, between the security device 15 and the motion sensor 16, and between the security device 15 and the vibration sensor 18. Initially, the user of the client device 12 registers at the server 11 for downloading application program or software (hereinafter "app") that facilitates a pairing procedure. For convenience, only pairing between the security device 15 and the vibration sensor 18 is illustrated in FIG. 4. Referring to FIG. 4, by executing the app, operations 401 to 404 in the pairing procedure in the form of graphical user interface (GUI) displays are provided on the screen of the client device 12.

In operation 401, paring the vibration sensor 18 and the security device 15 includes pushing a pairing button (not shown) on each of the security device 15 and the vibration sensor 18. Pushing the pairing buttons results in linking the device IDs of the security device 15 and the vibration sensor 18 so that both the devices can "know" each other. Furthermore, pairing the security device 15 and another vibration sensor or pairing the security device 15 and the motion sensor 16 can also be achieved in a similar fashion.

In operation 402, it is determined whether the vibration sensor 18 is set to be a beacon-type sensor. If not, as previously discussed, the vibration sensor 18 would be installed at a specific spot. In operation 403, the vibration sensor 18 is given a name. For example, the vibration sensor 18 is named after the specific spot, such as "safe deposit box." If the vibration sensor 18 is set to be a beacon-type sensor, as previously discussed, the vibration sensor 18 would be carried by a person. In operation 404, the beacon-type vibration sensor 18 is given a name. For example, the vibration sensor 18 is named after a family member of the house, such as "Jerry."

Accordingly, in the case of a non-beacon application, when the safe deposit box is budged, the vibration sensor named "safe deposit box" reports the vibration event to the security device 15, which in turn reports the same to the client device 12 paired with the security device 15. User of the client device 12 receives a live video of the safe deposit box currently taken by camera 20. Moreover, in the case of a beacon application, when Jerry comes back home from school, the vibration sensor named "Jerry" already put in Jerry's school bag reports such an event to the security device 15, which in turn reports the same to the client device 12 paired with the security device 15. User of the client device 12 receives a live video currently taken by camera 20, showing Jerry walking towards the front door.

FIG. 5 is a diagram showing an exemplary deployment of paired devices for a building 50. Referring to FIG. 5, for illustration, four sets of paired devices are arranged at different locations of interest in the building 50.

The first set of paired devices includes a security device 15A, motion sensors 16A1, 16A2, and a vibration sensor 18A1. The security device 15A is installed near a front door of the building 50. The motion sensor 16A1 is also installed near the front door to facilitate detection of a walk-in or walk-out event. The motion sensor 16A2 is installed on a wall facing the front door. The vibration sensor 18A1 is installed at a room's door near the front door. Accordingly, the first set of paired devices 15A, 16A1, 16A2 and 18A1 is deployed to protect the front door area.

Moreover, the security device 15A is configured to play a pre-recorded ring tone, music or voice associated with one of the motion sensors 16A1, 16A2 and the vibration sensor 18A1 when a corresponding one of the motion sensors 16A1, 16A2 and the vibration sensor 18A1 is triggered. Furthermore, the security device 15A is configured to play a pre-recorded ring tone, music or voice associated with one of client devices 12 paired with the security device 15A when a corresponding one of the client devices 12 enters the beacon coverage of the security device 15A.

The second set of paired devices includes a security device 15B, a motion sensor 16B and a vibration sensor 18B. The security device 15B is installed on a living room window. The motion sensor 16B is installed on a wall facing the living room. The vibration sensor 18B is installed on a French window between the living room and a balcony. Accordingly, the second set of paired devices 15B, 16B and 18B is deployed to protect the living room area.

The third set of paired devices includes a security device 15C and vibration sensors 18C1 and 18C2. The security device 15C is installed near a door of a guest room. The vibration sensor 18C1 is installed at a window of the guest room, while the vibration sensor 18C2 is installed at a railing of a balcony of the guest room. Accordingly, the third set of paired devices 15C, 18C1 and 18C2 is deployed to protect the guest room area.

The fourth set of paired devices includes a security device 15D, a motion sensor 16D and vibration sensors 18D1 and 18D2. The security device 15D is installed on a wall of a master room. The motion sensor 16D is installed at a window of the master room. The vibration sensor 18D1 is installed at a safe deposit box. Moreover, the vibration sensor 18D2 is installed at the window of the master room. Accordingly, the fourth set of paired devices 15D, 16D, 18D1 and 18D2 is deployed to protect the master room area.

Functions and features of the security system 10 may be summarized in the following operation modes: Door Bell/Camera mode, Intercom/Call Bell mode, Visual verification/IP Cam mode and Check-In/Beacon mode, which will be described in detail below. These operation modes can be operated individually or in combination.

Door Bell/Camera Mode

When a visitor presses the bell 24 of the security device 15, the bell 24 is activated. The processing unit 25, in response to the activation of the bell 24, enables the camera 20, the microphone 21, the speaker 22 and the first I/O port 151. The security device 15 allows the visitor to have a two-way audio and one-way video communication with the user of the client device 12. The visitor is not aware of he or she is under watch by the user through the camera 20, and has no idea whether the user talking behind the security device 15 is actually in the house or not. Effectively, the security device 15 prevents a visitor from knowing whether the user is at home. Moreover, with the security device 15, the user of the client device 12 remote from home can indicate a delivery man where to leave a package.

Intercom/Call Bell Mode

The security device 15 can play an audio effect such as a ring tone, music or voice when the bell 24 is pressed, the motion sensor 16 is triggered, the vibration sensor 18 is triggered or the client device 12 connects to the security device 15. Specifically, in some embodiments, the security device 15 can play a unique audio effect corresponding to the motion sensor 16, vibration sensor 18 or client device 12. As a result, when a specific effect is played, the corresponding sensor or client device currently communicating with the security device 15 is recognized. Such features enable the security device 15 to provide intercom or call bell service, as often seen in a hotel or hospital.

Visual Verification/IP Cam Mode

Assume a scenario that a thief breaks into the building 50 through the guest room window. The vibration sensor 18C1 is triggered and reports the vibration event to the security device 15C. The security device 15C, in response to the report, enables the camera 20, the microphone 21, the speaker 22 and the first I/O port 151. The camera 20 of the security device 15C then captures an image of the guest room. Moreover, the security device 15C transmits the image to the client device 12 via the server 11.

Assume another scenario that a thief slips into the living room. The motion sensor 16B is triggered and reports the motion event to the security device 15B. The security device 15B, in response to the report, enables the camera 20, the microphone 21, the speaker 22 and the first I/O port 151. Similarly, the camera 20 of the security device 15B then captures an image of the living room. Moreover, the security device 15B transmits the image to the client device 12 via the server 11.

Check-in/Beacon Mode

FIG. 6 is a diagram showing the security device 15 operating in the check-in/beacon mode in accordance with some embodiments of the present invention. Referring to FIG. 6, a vibration sensor 18A2 paired with the security device 15A is triggered when enters the beacon coverage of the security device 15A. The security device 15A reports such an event to the client device 12. As previously discussed, the vibration sensor 18A2 may be carried by a person. For example, Jerry carries the vibration sensor 18A2 to school. Once the vibration sensor 18A2 moves out of the beacon coverage, no communication is available between the security device 15A and the vibration sensor 18A2. When Jerry comes home from school, he as well as the vibration sensor 18A2 enters the beacon coverage. The security device 15A captures an image in front of the front door of the building 50 and sends the image to the client device 12. In this scenario, Jerry is a kid and the user of the client device 12 is his parent. The user is thus informed that Jerry gets home safely.

FIG. 7 is a diagram showing a method of automatically switching the security device 15A, in accordance with some embodiments of the present invention. Referring to FIG. 7, for illustration, only the security device 15A, the client device 12 and the vibration sensor 18A2 are shown. To achieve the function of automatic switching, the vibration sensor 18A2 can be set in the same manner as the client device 12 as previously discussed with reference to FIG. 3. After the client device 12 and the vibration sensor 18A2 are set, the security device 15A can be automatically switched to normal mode operation in response to a walk-out event, as shown in the left upper part of FIG. 7, and can be automatically switched to standby mode operation in response to a walk-in event, as shown in the left lower part of FIG. 7.

FIG. 8 is a diagram showing a method of scheduling a motion sensor, in accordance with some embodiments of the present invention. Referring to FIG. 8, a GUI display of the client device 12 is shown. The user is allowed to select a first specific date or period for the motion sensor 16 to operate at an enabled or alert state, and a second specific date or period for the motion sensor 16 to operate at a disabled state. When the schedule is set, the client device 12 transmits instructions to the security device 15. The security device 15, in accordance with the schedule, enables or disables the motion sensor 16. In this way, the motion sensor 16 can be automatically enabled or disabled without manual operation.

Embodiments according to the present disclosure provide a security device. The security device comprises a first input/output (I/O) port for remote communication over a first network, a second I/O port for local communication over a second network, a camera, and a processing unit configured to keep the camera at a disabled state until an alert signal indicating an event is received from a sensor over the second network, and report the event to a server over the first network.

In an embodiment, the security device further comprises an audio device including at least one of a microphone or a speaker. Moreover, the processing unit is configured to keep the audio device at a disabled state until an alert signal indicating an event is received from the sensor over the second network.

In another embodiment, the processing unit is configured to report the event to a client device via the server over the first network when the client device is disposed remote to the security device, or report the event to the client device over the second network when the client device is disposed local to the security device.

In still another embodiment, the security device further comprises a memory configured to store global positioning system (GPS) coordinates of the client device. Moreover, the processing unit is configured to compare the stored GPS coordinates with GPS coordinates of another client device.

In yet another embodiment, the first network includes one of WiFi, $3^{rd}$-Generation (3G) and $4^{th}$-Generation (4G), while the second network includes Bluetooth.

In yet still another embodiment, the sensor includes a motion sensor configured to detect a motion event of an object as the object enters into its field of view.

In a further embodiment, the camera and the audio device are disabled as a client device paired with the security device moves into a beacon coverage of the security device, and are enabled as the client device moves out of the beacon coverage of the security device.

In another embodiment, the sensor includes a vibration sensor configured to detect a vibration event in response to a change in orientation.

In still another embodiment, the processing unit is configured to report an event to a client device as the vibration sensor moves into a beacon coverage of the security device.

In yet another embodiment, the camera and the audio device are disabled as the vibration sensor moves into a beacon coverage of the security device, and are enabled as the vibration sensor moves out of the beacon coverage of the security device.

Some embodiments according to the present disclosure provide a security system comprising a security device and a sensor paired with the security device. The security device comprises a first input/output (I/O) port for remote communication over a first network, a second I/O port for local communication over a second network, and a processing unit. Moreover, the sensor is configured to, when triggered by an event detected, send an alert signal indicating the event over the second network to the security device. Furthermore, the processing unit is configured to report the event to a client device paired with the security device over the first network or the second network.

In an embodiment, the security device further comprises a camera. Moreover, the processing unit is configured to keep the camera at a disabled state until the alert signal is sent from the sensor over the second network.

In another embodiment, the security device further comprises an audio device including at least one of a microphone or a speaker. Furthermore, the processing unit is configured to keep the audio device at a disabled state until the alert signal is sent from the sensor over the second network.

In still another embodiment, the security system further comprises a memory configured to store global positioning system (GPS) coordinates of a client device paired with the security device. In addition, the processing unit is configured to compare the stored GPS coordinates with GPS coordinates of another client device.

In yet another embodiment, the sensor includes a motion sensor configured to detect a motion event of an object as the object enters into its field of view.

In yet still another embodiment, the camera and the audio device are disabled as a client device paired with the security device moves into a beacon coverage of the security device, and are enabled as the client device moves out of the beacon coverage of the security device.

In a further embodiment, the sensor includes a vibration sensor configured to detect a vibration event in response to a change in orientation.

In another embodiment, the processing unit is configured to report an event to a client device as the vibration sensor moves into a beacon coverage of the security device.

In yet another embodiment, the camera and the audio device are disabled as the vibration sensor moves into a beacon coverage of the security device, and are enabled as the vibration sensor moves out of the beacon coverage of the security device.

In still another embodiment, the security device and the sensor form a first set of paired devices deployed at a first location of interest. In addition, the system further comprises a second set of paired devices deployed at a second location of interest different from the first location.

Although the present invention and its advantages have been described in detail, it should be understood that various changes, substitutions and alterations can be made herein without departing from the spirit and scope of the invention as defined by the appended claims. For example, many of the operations discussed above can be implemented in different methodologies and replaced by other operations, or a combination thereof.

Moreover, the scope of the present application is not intended to be limited to the particular embodiments of the process, machine, methods and steps described in the specification. As one of ordinary skill in the art will readily appreciate from the disclosure of the present invention, processes, machines, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, methods, or steps.

What is claimed is:

1. A security device within a housing, comprising:
   a first input/output (I/O) port for remote communication over a first network;
   a second I/O port for local communication over a second network;
   a camera;
   an audio device; and
   a processing unit configured to keep the camera at a disabled state until an alert signal indicating an event is received from a sensor over the second network, and report the event to a server over the first network;

wherein the camera and the audio device are disabled as a client device paired with the security device moves into a beacon coverage of the security device, and are enabled as the client device moves out of the beacon coverage of the security device.

2. The security device as claimed in claim 1, wherein the audio device includes at least one of a microphone or a speaker, wherein the processing unit is configured to keep the audio device at a disabled state until the alert signal indicating the event is received from the sensor over the second network.

3. The security device as claimed in claim 1, wherein the processing unit is configured to report the event to a client device via the server over the first network when the client device is disposed remote to the security device, or report the event to the client device over the second network when the client device is disposed local to the security device.

4. The security device as claimed in claim 1 further comprising a memory configured to store global positioning system (GPS) coordinates of the client device, wherein the processing unit is configured to compare the stored GPS coordinates with GPS coordinates of another client device.

5. The security device as claimed in claim 1, wherein the first network includes one of WiFi, $3^{rd}$-Generation (3G) and $4^{th}$-Generation (4G), and the second network includes Bluetooth.

6. The security device as claimed in claim 1, wherein the sensor includes a motion sensor configured to detect a motion event of an object as the object enters into its field of view.

7. The security device as claimed in claim 1, wherein the sensor includes a vibration sensor configured to detect a vibration event in response to a change in orientation.

8. The security device as claimed in claim 7, wherein the processing unit is configured to report an event to a client device as the vibration sensor moves into a beacon coverage of the security device.

9. The security device as claimed in claim 7, wherein the camera is disabled as the vibration sensor moves into a beacon coverage of the security device, and is enabled as the vibration sensor moves out of the beacon coverage of the security device.

10. A security system, comprising:
a security device, comprising:
  a first input/output (I/O) port for remote communication over a first network;
  a second I/O port for local communication over a second network;
  a processing unit;
  a vibration sensor;
  a camera;
  an audio device; and
a sensor paired with the security device and configured to, when triggered by an event detected, send an alert signal indicating the event over the second network to the security device,
wherein pairing the vibration sensor and the security device includes pushing a pairing button on each of the security device and the vibration sensor,
wherein the processing unit is configured to report the event to a client device paired with the security device over the first network or the second network;
wherein the camera and the audio device are disabled as the client device paired with the security device moves into a beacon coverage of the security device, and are enabled as the client device moves out of the beacon coverage of the security device.

11. The security system as claimed in claim 10, wherein the processing unit is configured to keep the camera at a disabled state until the alert signal is sent from the sensor over the second network.

12. The security system as claimed in claim 11, wherein the audio device includes at least one of a microphone or a speaker, wherein the processing unit is configured to keep the audio device at a disabled state until the alert signal is sent from the sensor over the second network.

13. The security system as claimed in claim 10 further comprising a memory configured to store global positioning system (GPS) coordinates of a client device paired with the security device, wherein the processing unit is configured to compare the stored GPS coordinates with GPS coordinates of another client device.

14. The security system as claimed in claim 10, wherein the sensor includes a motion sensor configured to detect a motion event of an object as the object enters into its field of view.

15. The security system as claimed in claim 10, wherein the sensor includes the vibration sensor configured to detect a vibration event in response to a change in orientation.

16. The security system as claimed in claim 15, wherein the processing unit is configured to report an event to a client device as the vibration sensor moves into a beacon coverage of the security device.

17. The security system as claimed in claim 12, wherein the camera and audio device are disabled as the vibration sensor moves into a beacon coverage of the security device, and are enabled as the vibration sensor moves out of the beacon coverage of the security device.

18. The security system as claimed in claim 10, wherein the security device and the sensor form a first set of paired devices deployed at a first location of interest, further comprising a second set of paired devices deployed at a second location of interest different from the first location.

* * * * *